Nov. 15, 1960  H. E. BARNETT ET AL  2,959,891
DOLL
Filed April 14, 1959  3 Sheets-Sheet 1

INVENTOR.
HARRY E. BARNETT
RICHARD E. BIRNBAUM
BY
*James and Franklin*
ATTORNEYS Nov. 15, 1960  H. E. BARNETT ET AL  2,959,891
DOLL
Filed April 14, 1959  3 Sheets-Sheet 2

INVENTOR.
HARRY E. BARNETT
RICHARD E. BIRNBAUM
BY
*James and Franklin*
ATTORNEYS Nov. 15, 1960 H. E. BARNETT ET AL 2,959,891
DOLL
Filed April 14, 1959 3 Sheets-Sheet 3

INVENTOR.
HARRY E. BARNETT
RICHARD E. BIRNBAUM
BY
*James and Franklin*
ATTORNEYS

United States Patent Office 2,959,891
Patented Nov. 15, 1960

2,959,891
DOLL

Harry E. Barnett, Chicago, Ill., and Richard E. Birnbaum, Harrison, N.Y., assignors to Alexander Doll Company, Inc., New York, N.Y., a corporation of New York Filed Apr. 14, 1959, Ser. No. 806,313

7 Claims. (Cl. 46—135)

The present invention relates to the combination of a doll and devices adapted to be attached thereto in order to simulate diseases and/or injuries to which the human being is subject, as well as therapeutic devices to be used in accordance therewith.

In many instances children who are themselves sick or injured develop a morbid attitude concerning their disability, particularly with regard to whether a cure will ever be effected. The commonplace occurrence of the diseases to which children are subject, such as measles, chicken pox, mumps and the like, and the frequency of accidents resulting in broken limbs, and extensive knowledge and experience relative to the present state of medical science, clearly demonstrate to the adult mind that such fears are irrational, but they are nonetheless quite real and unpleasant to those who have them. In addition it is often the case that the very existence of such feelings delays physical recovery.

Most of the common diseases and disabilities to which children are subject are accompanied by characteristic and readily visible symptoms or indicia. The spot-like rash of measles, the pox of chicken pox, and the glandular swelling of mumps, are familiar to all. Likewise the use of casts or splints with broken bones, and the use of bandages with cuts or lacerations are commonplace.

It has been found that children especially find reassurance for many of the anxieties which plague them if they can act out the conflicts or problems involved. Indeed, this is a conventional psychiatric technique even with adults. A child who is sick or injured will tend to minimize his personal problem if he can associate those problems with a make-believe situation and particularly if he can act out a cure in that play situation.

Since all children are familiar with and, to greater or lesser extent, play with dolls, and since it is well known that dolls are used by children in imaginary situations paralleling the real life situations to which the children are exposed, doll-play is believed to be exceptionally well suited to the abatement or amelioration of the anxiety situations to which children are subject because of illness or injury. If a child can make her doll "sick" and then "cure" her by following the same sort of regimen as is prescribed by the doctor who is treating the child, and particularly if the "cure" can be made progressively more and more tangibly visible, then the child's mental attitude toward her own illness or injury will be greatly improved and her own cure is likely to be accelerated, in part because she is more willing to obey the doctor's orders (she gives the same orders to the doll, who obeys them), and in part because of her improved mental attitude.

It is therefore a prime object of the present invention to provide a doll which can actually be made "sick" by the application thereto of the characteristic visible symptoms of selected diseases, and which can be "cured" in play fashion either by the application thereto of therapeutic devices, the simulated administration of medicines, the progressive disappearance of symptoms, or combinations of all of these precedures.

Even apart from its therapeutic effect on children who are themselves ill or disabled, the construction of the present invention permits the use of a doll in realistic play situations of a type to which the dolls of the prior art did not lend themselves. With the structure for the present invention one can "play doctor" much more realistically and effectively, because the doll patient will actually be "sick" and its "symptoms" can be caused to disappear, apparently in response to the medical administrations of the youthful user.

To these ends a series of elements are provided which are adapted to be selectively removably attached to the body of the doll so as to simulate selected types of injuries or symptoms of selected diseases. Other elements are provided adapted to be attached to the doll which simulate therapeutic devices or the like adapted to be used in conjunction with human injuries or disabilties. These various elements may be used singly or in combination, depending upon the transitory wishes of the users, and the elements simulating disease symptoms are preferably provided in such number that the various stages of a particular disease, ranging, for example, from the first appearance of a few measles spots through a full outbreak thereof and then to the ultimate disappearance thereof, may be simulated at will.

Because of the distinctive and visible nature of the symptoms of disease such as measles, chicken pox and mumps, the invention is here specifically disclosed in conjunction with the elements simulating the symptoms of those diseases. Each of the elements is in the form of a patch of appropriate size, one surface of which may be provided with a pressure sensitive adhesive so that any desired number of patches may be secured to the outer surface of the doll at appropriate locations and then removed therefrom when desired. Typical of therapeutic devices are casts, splints and crutches, and the construction of the present invention is here illustrated with all of these devices, each being specially designed so that it may be readily applied to or removed from an appropriate portion of the body of the doll.

The play value of the construction of the present invention will be apparent. Its therapeutic value is attested to by the fact that it has been endorsed by leading pediatric specialists.

To the accomplishment of the above, and to such other objects as may hereinafter appear, the present invention relates to a doll construction as defined in the appended claims and as described in this specification, taken together with the accompanying drawings, in which:

Figure 1:
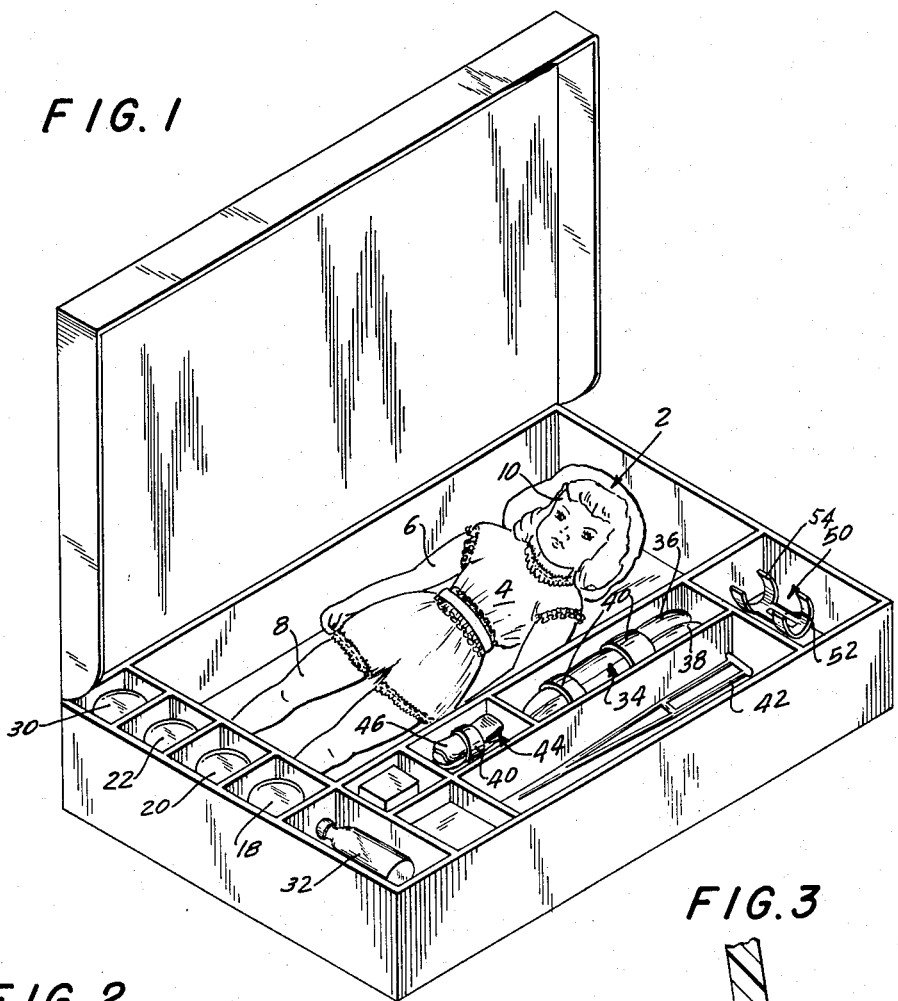
Fig. 1 is a three-quarter perspective view of the various parts of the doll construction of the present invention in a typical package.
Figure 2:
Fig. 2 is a three-quarter perspective view of the head of the doll to which patches simulating the symptoms of measles or chicken pox have been secured.
Figure 3:
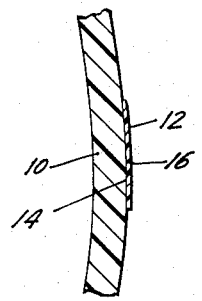
Fig. 3 is a cross sectional view taken along the line 3—3 of Fig. 2.
Figure 4:
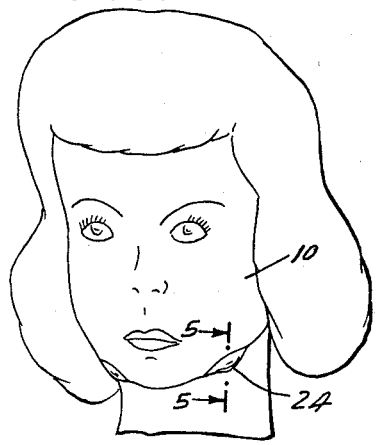
Fig. 4 is a three-quarter perspective view of the doll head to which patches simulating the symptoms of mumps have been attached.
Figure 5:
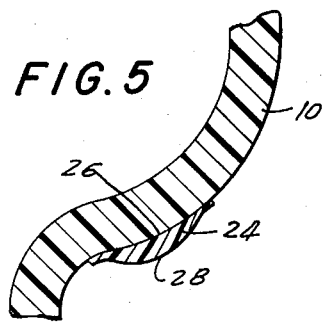
Fig. 5 is a cross sectional view taken along the line 5—5 of Fig. 4.

In accordance with the present invention a doll, generally designated 2, of any desired size or shape is provided. In the form here disclosed it comprises a body 4, arms 6, legs 8 and head 10. To simulate the distinctive spot-like symptoms of measles a plurality of fabric or plastic patches 12 are provided, the undersurface 14 thereof preferably carrying a pressure-sensitive adhesive and the outer surface 16 thereof being colored to simulate the measles rash, the size and configuration of the patches 12 simulating the rash spots which might occur in a typical case of measles. These patches 12 may be contained within a jar 18 provided with the doll 2. The elements simulating the symptoms of chicken pox may be provided in a container 20 and may be similar to the measles-simulating elements 12 in general construction, although their outer surfaces 16, size and shape conform in appearance to the characteristic individual pox of the chicken pox disease. Thus the elements in the drawing designated by the reference numeral 12 may be considered either as simulating the measles rash or the chicken pox rash. The elements 24 simulating the symptoms of mumps may be provided in a container 22. These elements 24, illustrated in Figs. 4 and 5, have an undersurface 26 to which adhesive may be applied and have an outer surface 28 which is appreciably convex, the elements 24 having sufficient thickness so that when they are applied to the proper portions of the doll head 10, they will give the appearance of the type of swelling which normally accompanies a case of mumps. If desired, sets of mumps-simulating elements 24 of gradually decreasing convexity may be provided so as to simulate the growth and diminution of the swelling of the disease as it progresses.

While the undersurfaces 14 and 26 of the elements 12 and 24 may be provided with adhesive layers, preferably of the pressure-sensitive type, which facilitate the ready application, removal and reapplication of the respective elements 12 and 24 to the doll, it is also feasible, of course, to apply the adhesive separately if desired.

In order to simulate the therapeutic treatment to which persons are subjected when they have diseases of the type above described, play pills may be provided in container 30 and play medicine in container 32.

Figure 6:
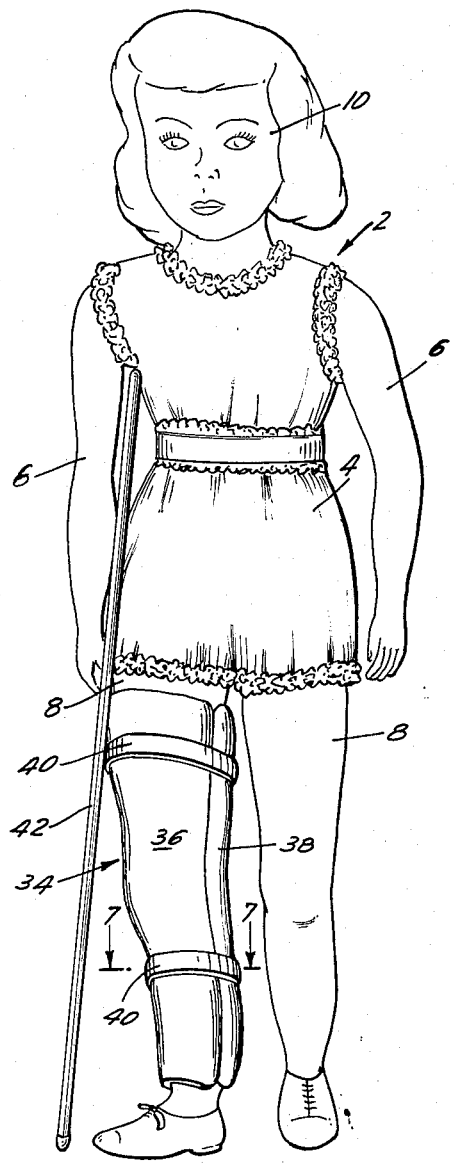
Fig. 6 is a three-quarter perspective view of the doll with a leg cast attached and using a crutch.
Figure 7:
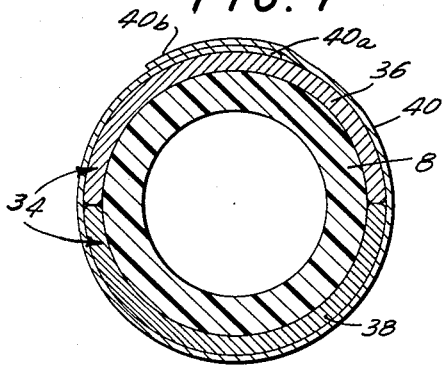
Fig. 7 is a cross sectional view taken along the line 7—7 of Fig. 6.

In order to simulate the therapeutic treatment to which children may be subjected in the case of bodily injuries, a leg cast generally designated 34 and specifically illustrated in Figs. 6 and 7 is provided. This cast comprises a pair of sections 36 and 38 shaped to fit the leg 8 of the doll 2, the sections 36 and 38 being held together in encompassing relation to the doll leg 8 by means of resilient clips or bands 40 which may be in the form of endless elastic bands but which are here specifically disclosed in the form of metal rings having overlapping ends 40a and 40b, the resiliency of the metal causing the rings to contract. A crutch 42 may be provided which the doll may use when a leg cast is applied thereto.

Figure 8:
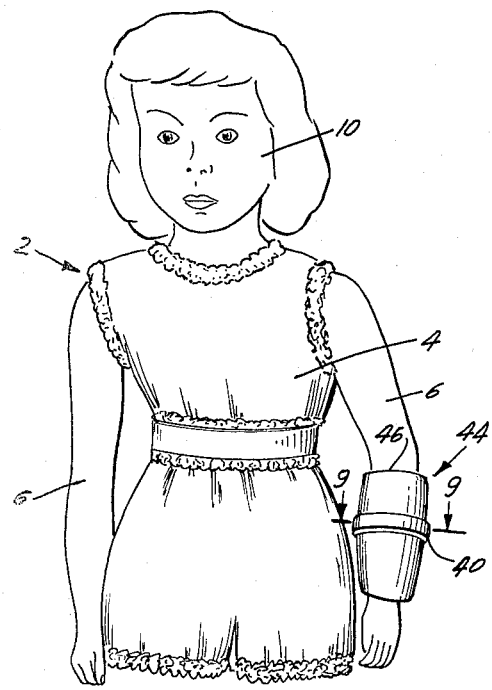
Fig. 8 is a three-quarter perspective view of a doll to which an arm cast has been applied.
Figure 10:
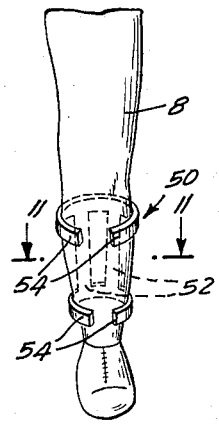
Fig. 10 is a three-quarter perspective view of a doll leg to which a splint has been applied.
Figure 9:
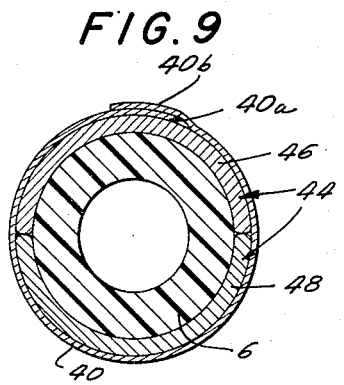
Fig. 9 is a cross sectional view taken along the line 9—9 of Fig. 8.
Figure 11:
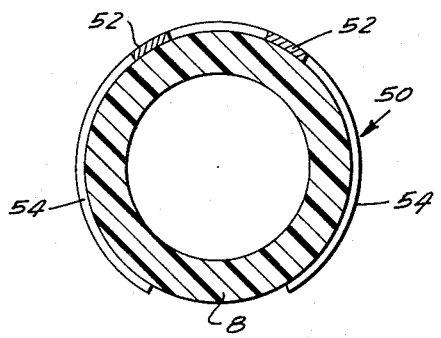
Fig. 11 is a cross sectional view taken along the line 11—11 of Fig. 10.

An arm cast 44 is illustrated in Figs. 8 and 9. It may be composed of two sections 46 and 48 which fit around a portion of the doll arm 6 and which are adapted to be held in position thereon by a resilient clamp 40.

The treatment of less drastic injuries to the arm or leg may be simulated by means of the splint 50 which may be formed of plastic or metal and which comprises the longitudinally extending members 52 from the top and bottom of which extend resiliently expandable arms 54 adapted to snap around the doll leg or arm to which the splint is applied.

The use of other therapeutic devices such as bandages or the like, and the provision of elements adapted to be secured to the doll body so as to simulate various types of physical injury, all fall within the broad scope of the instant invention.

It will be apparent that with the structure here disclosed a child is given scope for a tremendous amount of imaginative play, whether the present invention is used alone or in conjunction with a toy set or doctor's instruments, and that the device of the present invention is particularly applicable for use by children who are themselves ill and who can, by applying the symptom-simulating or therapeutic devices to the doll, act out their own problems, reassuringly anticipate their own recovery, and thus enhance their piece of mind and hence the rapidity of their recovery. Use of the structure of the instant invention may also kindle or intensify interest in nursing or medicine.

While but a limited number of embodiments of the present invention have been here disclosed, it will be apparent that many variations may be made all within the scope of the following claims.

We claim:

1. In combination, a doll representing a human, and a plurality of separate elements each individually attachable to and removable from the outer surface of said doll, said elements having one surface thereof simulating in appearance a physical bodily characteristic representative of a predetermined form of disease to which humans are subject, and having another surface thereof which carries an adhesive, whereby one or more of said elements may be used to represent varying stages or degrees of the disease.

2. The combination of claim 1, in which said elements simulate visible symptoms of chicken pox.

3. The combination of claim 1, in which said elements simulate visible symptoms of measles.

4. The combination of claim 1, in which said elements simulate visible symptoms of mumps.

5. In the combination of claim 1, a plurality of individual sets of elements, said one surface of each element of a given set simulating in appearance a visible symptom of a given disease, said one surface of each element of another set simulating in appearance a visible symptom of a different disease.

6. In the combination of claim 1, a plurality of individual sets of elements, said one surface of each element of a given set simulating in appearance the rash-type symptom of chicken pox, said one surface of each element of another set simulating in appearance the rash-type symptom of measles.

7. In the combination of claim 1, a plurality of individual sets of elements, said one surface of each element of a given set simulating in appearance a rash-type disease symptom, said one surface of each element of another set being convex so as to simulate a mumps-like swelling.

References Cited in the file of this patent

UNITED STATES PATENTS

| 1,916,811 | Schwartz | July 4, 1933 |
| 2,079,550 | De Mott | May 4, 1937 |
| 2,302,349 | Renshaw | Nov. 17, 1942 |
| 2,781,611 | Bills et al. | Feb. 19, 1957 |

FOREIGN PATENTS

| 423,200 | Great Britain | Jan. 28, 1935 |